(12) United States Patent
Eckert et al.

(10) Patent No.: US 8,018,964 B2
(45) Date of Patent: Sep. 13, 2011

(54) MULTICAST OPERATIONS USING PRIORITIZED STATE INFORMATION

(75) Inventors: Toerless Eckert, Mountain View, CA (US); Gregory J Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 950 days.

(21) Appl. No.: 11/303,170

(22) Filed: Dec. 16, 2005

(65) Prior Publication Data

US 2007/0140107 A1 Jun. 21, 2007

(51) Int. Cl.
*H04J 3/26* (2006.01)

(52) U.S. Cl. ............... 370/432; 370/312; 370/395.3; 370/395.31

(58) Field of Classification Search .......... 370/395, 370/397, 398, 399, 230–235, 432, 312, 390.3, 370/390.31

See application file for complete search history.

(56) References Cited

U.S. PATENT DOCUMENTS

| | | | | |
|---|---|---|---|---|
| 6,252,857 B1 * | 6/2001 | Fendick et al. | ............... | 370/254 |
| 6,356,553 B1 * | 3/2002 | Nagami et al. | ............... | 370/397 |
| 6,574,667 B1 * | 6/2003 | Blumenau et al. | ............ | 709/229 |
| 6,636,895 B1 * | 10/2003 | Li et al. | ......................... | 709/238 |
| 6,931,005 B1 * | 8/2005 | Wilhelm | ........................ | 370/390 |
| 7,843,917 B2 * | 11/2010 | Brockners et al. | ............ | 370/389 |
| 2002/0085506 A1 * | 7/2002 | Hundscheidt et al. | ........ | 370/254 |
| 2003/0165140 A1 * | 9/2003 | Tang et al. | ..................... | 370/393 |
| 2003/0223402 A1 * | 12/2003 | Sanchez et al. | ............... | 370/351 |
| 2004/0066781 A1 * | 4/2004 | Shankar et al. | ............... | 370/389 |
| 2004/0122890 A1 * | 6/2004 | Watkinson | .................... | 709/203 |
| 2004/0205215 A1 * | 10/2004 | Kouvelas et al. | .............. | 709/231 |
| 2004/0246984 A1 * | 12/2004 | Hundscheidt et al. | ........ | 370/432 |
| 2005/0195818 A1 * | 9/2005 | Hasegawa et al. | ............ | 370/390 |
| 2005/0201406 A1 * | 9/2005 | Sekine et al. | .................. | 370/432 |
| 2006/0168047 A1 * | 7/2006 | Li | ................................ | 709/206 |

* cited by examiner

*Primary Examiner* — Kwang B Yao
*Assistant Examiner* — Juvena Loo
(74) *Attorney, Agent, or Firm* — Campbell Stephenson LLP

(57) ABSTRACT

A classification mechanism to allow selected classes of multicast entries to be acted upon in a chosen order of priority during multicast distribution tree convergence is provided. Such prioritization allows for the designation of customers, networks or multicast groups to receive faster convergence of multicast distribution trees to modified multicast distribution trees in response to unavailability of an upstream router, and in performing other multicast-related tasks (e.g., PIM joins and prunes). One aspect of the present invention provides for multicast entries (also called multicast states) that are at a same priority level to be acted upon in a fair manner, thereby avoiding having certain multicast entries and their associated users from being acted upon consistently last.

18 Claims, 4 Drawing Sheets

MULTICAST OPERATIONS USING PRIORITIZED STATE INFORMATION

FIELD OF THE INVENTION

The field of this invention relates to information networks. Specifically, multicast states are provided with classifications permitting certain classes of multicast states to receive prioritization over other classes.

BACKGROUND OF THE INVENTION

Today's network links carry vast amounts of information. High bandwidth applications supported by these network links include, for example, streaming video, streaming audio, and large aggregations of voice traffic. In the future, network bandwidth demands will increase. Certain applications, such as streaming audio and streaming video, can generate a large amount of network traffic due to sending such a transmission to multiple subscribers. In order to help decrease network traffic load due to such applications, multicast protocols have been developed.

Multicast protocols enable multicast transmission (i.e., one-to-many connections) by replicating a multicast data packet close to a destination of that packet, obviating the need for multiple unicast connections for the same purpose. Upon receiving a multicast packet, a network node, such as a network router, can examine a multicast group destination address (GDA) of the packet and determine whether subscribers to the multicast packet are connected directly or indirectly to the network node. The network node can then replicate the multicast packet as needed and transmit the multicast packet to any connected subscribing nodes.

FIG. 1A is a simplified block diagram illustrating a network configuration over which a multicast datastream can be transmitted. Network 100 includes network routers 110, 120, 130, 140, and 150. Network router 110 is coupled to a source S1 of a multicast datastream. Network router 120 is coupled to a network element N1 that is a subscriber to the multicast datastream from S1. As illustrated, an initial route through network 100 that the multicast datastream traverses is via network router 110 to network router 130 to network router 120. This data path through network 100 is a branch of a multicast distribution tree.

Data flow within a multicast distribution tree is defined in terms of upstream and downstream, wherein upstream is the direction toward the source of the multicast datastream while downstream is in the direction toward the subscriber nodes of the multicast datastream. Network routers in network 100 can use several different protocols, alone or in combination, to build a multicast distribution tree.

Each router within network 100 can store and access a forwarding information base that may include unicast routing information. A forwarding information base can include entries that relate a network prefix, an identifier of a next-hop router that is upstream toward that network prefix, and an identifier of a port on the router that is coupled to the next-hop router. A router can populate such a forwarding information base through the use of internal gateway protocols (IGPs) (e.g., routing information protocol (RIP) (as defined in RFC 1058 and RFC 2453), open-shortest-path-first protocol (OSPF) (as described in RFC 2328), intermediate system-to-intermediate system (IS-IS) (as described in ISO 1059), and border gateway protocol (BGP) (as described in RFC 1771). The forwarding information base allows a router to determine a best next-hop router toward a subnet identified by a network prefix.

When a subscriber network element (e.g., N1) wishes to join a multicast group in order to receive a multicast datastream from a source, the network node can send a request packet to a neighboring router (e.g., router 120). Upon receiving the request, router 120 can determine whether it is already a member of the multicast distribution tree that is transporting the datastream for the requested source and multicast group. The determination can be performed by referencing a multicast routing table that can include source and multicast group entries, also called multicast state entries (S,G), each of which includes an incoming interface for the multicast datastream, outgoing interfaces for the multicast datastream, and an identifier of the reverse path forwarding neighbor. If the multicast routing table does contain an entry related to the requested multicast state, then the entry in the multicast routing table can be modified to include an interface coupled to the requesting network node as an outgoing interface for the datastream. If no corresponding entry is present in the multicast routing table, then network router 120 can perform operations to join or form a multicast distribution tree coupled to the source of the requested multicast datastream.

In order to build a multicast distribution tree, network router 120 can perform a reverse path forwarding (RPF) check to determine the router interface that is topologically closest to the root of the tree. In a point-to-multipoint distribution tree, the root can be the source of the multicast transmission, while in a multipoint-to-multipoint distribution tree (also known as a shared distribution tree) the root can be a rendezvous point. The RPF check can be performed by referencing the forwarding information base to determine the next-hop router toward the root. Once the RPF check has been performed and an RPF interface has been identified, router 120 can transmit a join message from that interface to the next-hop router (e.g., router 130) indicating that router 120 wants to receive packets for this multicast group from the identified source. Such a message is a (S,G) join message, which can be formatted using a protocol such as protocol independent multicast (PIM). The upstream router, router 130, can provide an acknowledgement to router 120 and perform a similar set of tasks to form or join multicast distribution tree, if the multicast routing table lacks an entry for the requested source and multicast group. Through the use of information generated by RPF and join message acknowledgments, multicast routing table entries can be built by each multicast distribution tree router.

A multicast state entry is present in the multicast routing table for every multicast group for which a subscriber is coupled, either directly or indirectly, to the router. For a large network 100, thousands of multicast state entries may be present in the multicast routing table of any particular router. For example, in a multicast routing table in router 120, several hundred multicast entries can identify the interface coupled to router 130 as the incoming interface.

FIG. 1B is a simplified block diagram illustrating a change in a multicast distribution tree due to unavailability of router 130. A router can become unavailable for a variety of reasons, including failure of the router, maintenance of the router, or a disruption in the communication lines coupling an upstream router to a downstream router. If an upstream router that is part of a multicast distribution tree becomes unavailable, steps can be taken to avoid the unavailable router and provide a modified multicast distribution tree or branch on which to carry the datastream.

In FIG. 1B, when router 130 becomes unavailable, a series of actions are triggered that ultimately can form a modified multicast distribution tree that includes router 110 to router 140 to router 150 to router 120. When router 130 becomes unavailable, router 120, for example, can discover that change in the network through the use of an internal gateway protocol such as those described above. Once such a change is detected, an RPF check can determine that the original multicast distribution tree no longer works; that is, for example, an RPF neighbor address in the multicast routing table for a particular state can no longer be contacted.

As with the initial configuration of the multicast distribution tree, RPF in router 120 can select a new incoming interface using data in the forwarding information base (e.g., finding a next best neighboring router to the source network prefix). Once a new RPF neighbor address has been determined for a multicast state, a (S,G) join (e.g., PIM join message) can be transmitted to the newly identified upstream router (e.g., router 150). In such a manner, a new multicast distribution tree can be formed in order to carry the datastream from source S1 to subscriber N1. The process of modifying a multicast distribution tree is called convergence and involves each router that is a member of a multicast distribution tree distributing update messages that stimulate the recalculation of an optimal route from a receiver to a source of a multicast datastream.

In a large network scenario where there may be thousands of multicast distribution trees through routers 110, 130 and 120, and convergence in router 120 due to the unavailability of router 130 within the network can take a period of time that is linearly dependent upon the number of multicast entries in router 120's multicast routing table. Convergence time for any one of the multicast entries can depend upon where the entry falls within the multicast routing table. That is, if distribution tree modifications are performed in multicast routing table entry order, then the last entry in the multicast routing table will be updated much later than the first entry in the multicast routing table. Thus, those later entries can experience delays equal to the time it takes to discover the unavailability of router 130, plus the time it takes for all preceding affected entries in the multicast routing table to converge, plus the time it takes for the multicast distribution tree for that state entry to converge.

Link disruption detection and unicast path convergence performance can both be tuned to provide sub-second convergence in many network topologies. Multicast convergence time is not only dependent upon link disruption detection and unicast path convergence performance, but is also dependent upon a number of multicast routing table entries in a network router that depend on the link that was disrupted. In many routing architectures today, multicast distribution trees can converge approximately at a rate of 1,000 multicast routing table entries per second, but with no predictable performance guarantee for the order in which state entries in a multicast routing table will converge. The informational content of a multicast datastream being transmitted over a multicast distribution tree can have varying levels of operational importance (e.g., premium video services and other broadcast video can have a lower tolerance for disruption in a datastream than multicast services for virtual private networks (MVPN)). Current network and network router implementations cannot provide for predictable, repeatable convergence performance across a range of state entries or for each deployed multicast service.

What is therefore desired is an ability to ensure that in the case of many multicast entries in a multicast routing table that convergence can occur quickly for chosen classes of multicast datastreams. Such classes can be defined by a network administrator in accord with appropriate criteria. It is also desirable to ensure fair convergence for multicast entries of a same class. That is, for example, if a particular class has a large number of associated multicast entries, then the same states are not always treated at the end of any tree building or rebuilding operations.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

The present invention provides a classification mechanism to allow selected classes of multicast entries to be acted upon in a chosen order of priority during convergence. Such prioritization can affect convergence of multicast distribution trees to modified multicast distribution trees in response to unavailability of an upstream router, and in performing (S,G) joins and prunes (e.g., PIM joins and prunes). In one aspect of the present invention, a provision is made to enable multicast entries (also called multicast states) that are at a same classification level to be acted upon in a fair manner, thereby avoiding having certain multicast entries and their associated users from being acted upon consistently last.

The present invention provides a mechanism for classifying multicast entries in a multicast routing table and a mechanism for using those classifications to provide differentiated treatment of multicast entries belonging to different classes (e.g., prioritizing certain classes) during convergence. As implied above, classification is desirable because there are different types of multicast traffic. Certain types of multicast traffic are less tolerant of disruptions in transmission of datastreams or require higher quality of service (QOS). By providing a means to classify multicast entries, a network administrator can assign a QOS-like identifier to the various states. Aside from datastream content, such a classification scheme can be based on other criteria such as customer identity so that customers using a provider network can opt to pay more to receive a higher priority for avoiding multicast disruption. Other motivations for classification or combinations of such criteria can be employed.

In one embodiment of the present invention, a classification scheme can be applied in a multicast routing table on an entry-by-entry basis. A class field can be provided for each entry in the multicast routing table into which a network administrator can provide a class identifier. Classes can be applied for every (S,G) state entry, or alternatively, classes can be applied for all datastreams to a particular multicast group address (*,G) or all datastreams from a particular source (S,*). In another embodiment of the present invention, a separate classification table can be provided associating multicast entries with a classification. In one aspect of these embodiments, a default classification can be defined which is assigned to any multicast entry that does not have a defined classification. Once provided, these multicast entry classifications can be used to order various multicast operations.

Figure 1A:
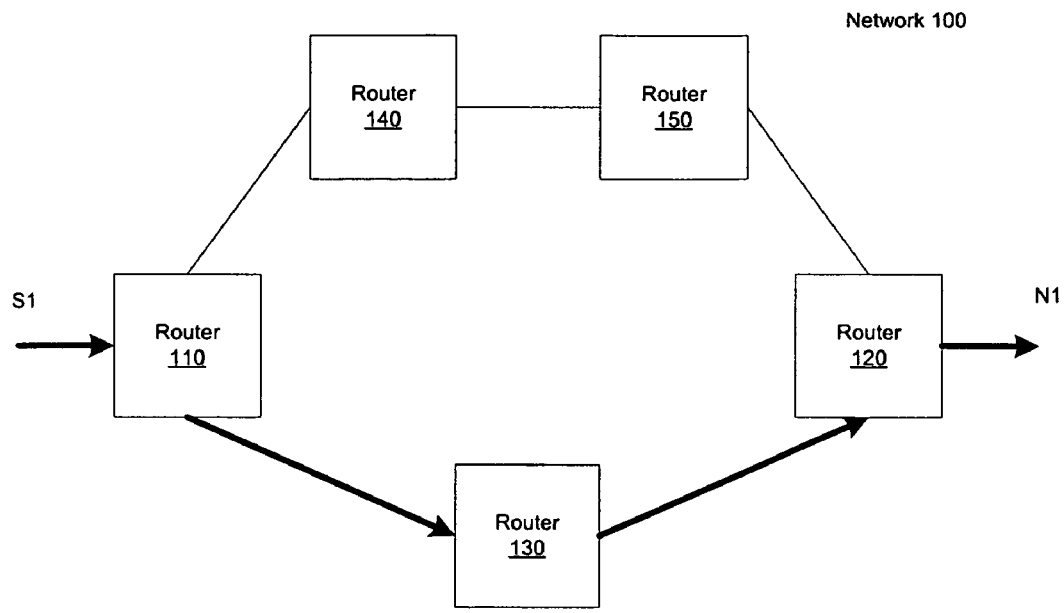
FIG. 1A is a simplified block diagram illustrating a network configuration over which a multicast datastream can be transmitted.
Figure 1B:
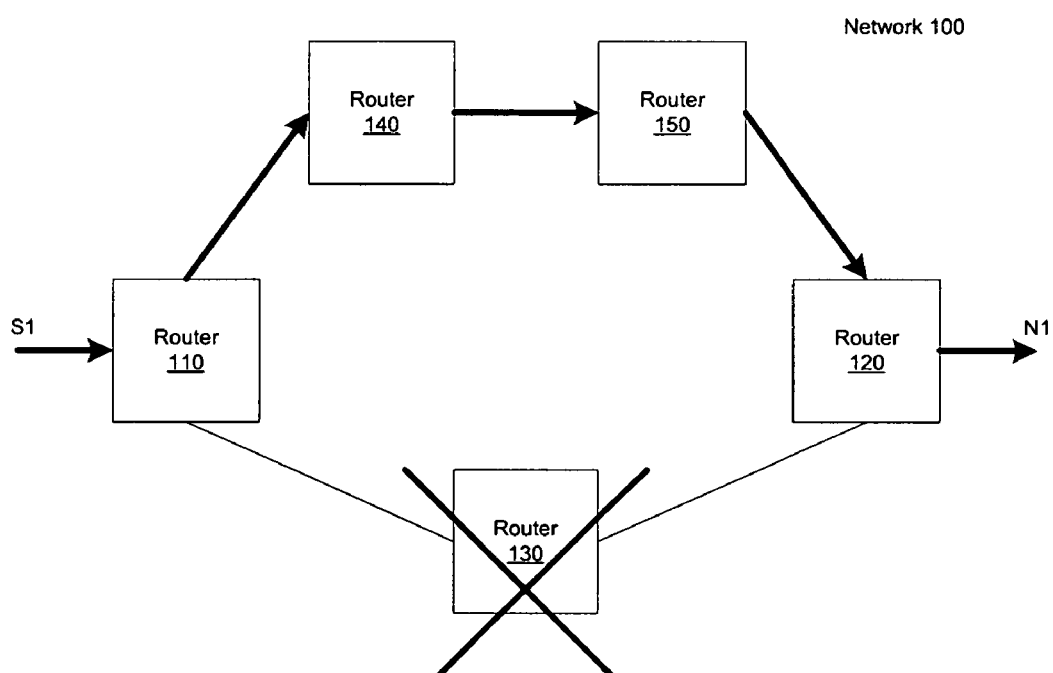
FIG. 1B is a simplified block diagram illustrating a change in a multicast distribution tree due to unavailability of a router.
Figure 2:
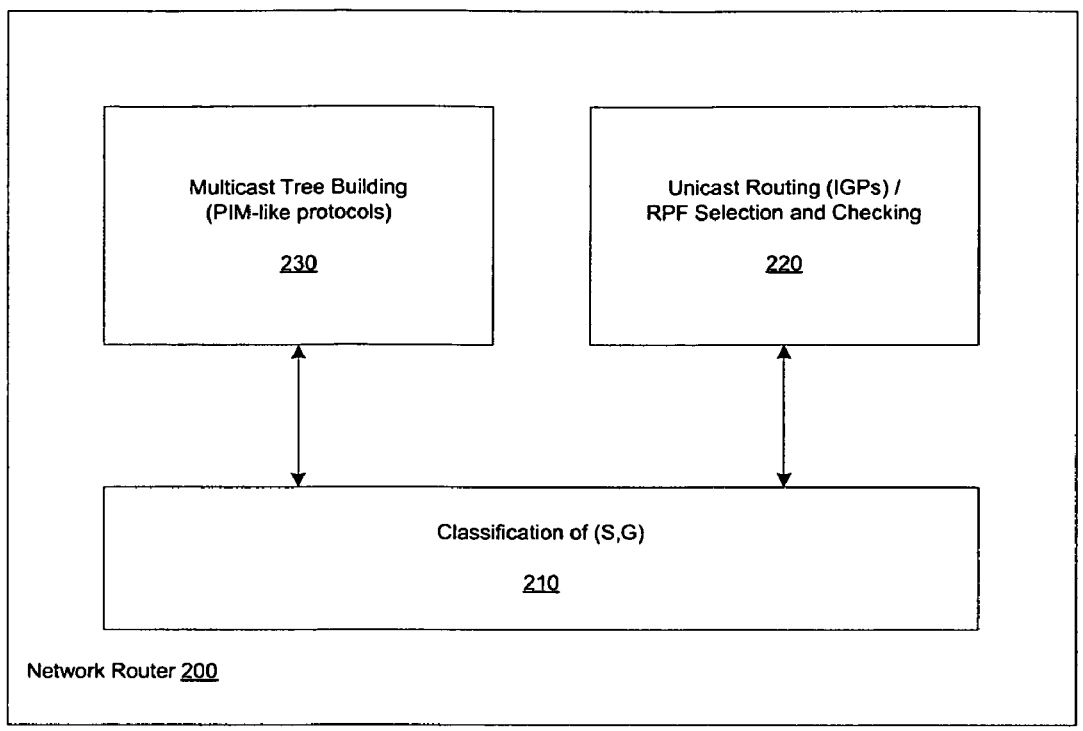
FIG. 2 is a simplified block diagram illustrating a relationship between multicast state classifications and multicast operations, in accord with one embodiment of the present invention.

FIG. 2 is a simplified block diagram illustrating a relationship between multicast entry classifications and multicast operations. A classification module 210 that manages the classification of multicast entries can be present in a network router 200. As described above, such a module can be configured to associate multicast entries with a set of classifications. Network router 200 can also include a unicast routing/RPF checking module 220. Module 220 can provide software and hardware tools the router can utilize to perform population of and updating of unicast tables such as a forwarding information base of network router 200. Module 220 can further provide tools required to perform RPF checking and selection for updating multicast router table next-hop information. Network router 200 can also include a multicast tree-building module 230 that provides PIM or PIM-like routines to join or leave multicast distribution trees. Modules 220 and 230 can use class information from classification module 210 in performing their tasks.

Unicast Routing/RPF Checking module 220 can populate a forwarding information base of network router 200 through the use of internal gateway protocols (IGP). Upon receiving information relating to next-hop routers, routines in module 220 can order network prefixes in the forwarding information base according to class information provided by classification module 210. In one aspect of the present invention, the forwarding information base can be populated in light of the multicast entry classes. Such population can be performed by ordering the classes, associating a class with a source address (and corresponding network prefix) for a multicast entry, and inserting network prefix entries in the forwarding information base in classification order. In another aspect of the present invention, a forwarding information base can be populated by the unicast IGPs and then periodically re-sorted according to multicast entry classifications.

Sorting the forwarding information base as described can permit a faster response to network changes for classes ordered first. Such faster responses can be achieved because certain unicast operations, such as periodic checking of next-hop routers, can occur in sequence order of the forwarding information base. Thus, if network prefixes associated with fast-response multicast entry classifications are placed near the top of the forwarding information base, then those network prefixes can be checked first during such periodic checking.

Unicast Routing/RPF Checking module 220 can also utilize the multicast entry classes in determining when reverse path forwarding checking is performed. Upon discovery that a next-hop router has become unavailable, RPF checking procedures can be used on multicast distribution trees according to an order of classes of the affected multicast entries. The RPF checking operations can be performed in the order of fastest response classification to lowest response classification.

In a similar manner, convergence operations of multicast tree building module 230 can also be ordered according to the classes set in classification module 210. Multicast tree building protocols, such as PIM, rely upon transmission of (S,G) join messages to a next-hop router to associate a present router with multicast transmissions for an identified state. In order to improve multicast distribution tree convergence times for desired classes, (S,G) join messages can be transmitted in an order suggested by the multicast entry classifications. As suggested for RPF checking, the (S,G) join messages can be transmitted in a class order of fastest response time to slowest response time. By relating performance of RPF checking and transmission of (S,G) join messages with ordered classes associated with related multicast entries, convergence delays for multicast entries with desired fast response time classifications can be reduced.

A network with many network elements and network routers can have a large number (tens of thousands) of multicast entries, and therefore a selected class can have as members a large number of multicast entries. In such a scenario, a problem similar to that addressed by providing classifications can occur within a classification; that is, there can be such a large number of multicast entries within a particular class that it can take some time for certain multicast entries to be treated and under certain ordering schemes (e.g., ordering multicast entries for processing according to address value) certain entries may always get treated late. In order to ensure fair treatment of multicast entries within a particular classification, a selection scheme can be adopted to ensure that each multicast state entry receives fair treatment. Alternatively, a selection scheme can be adopted to ensure that each user associated with a group of multicast entries is treated fairly. Selection schemes that can be adopted can be similar to those used in packet selection applications, such as round robin or weighted round robin, or alternatively, a random distribution or uniform distribution scheme can be applied. Through the use of such selection schemes, multicast entries can be treated individually, on a broadcast domain (VLAN) basis, or by user identification, in which case additional information may be provided in routing tables.

Figure 3:
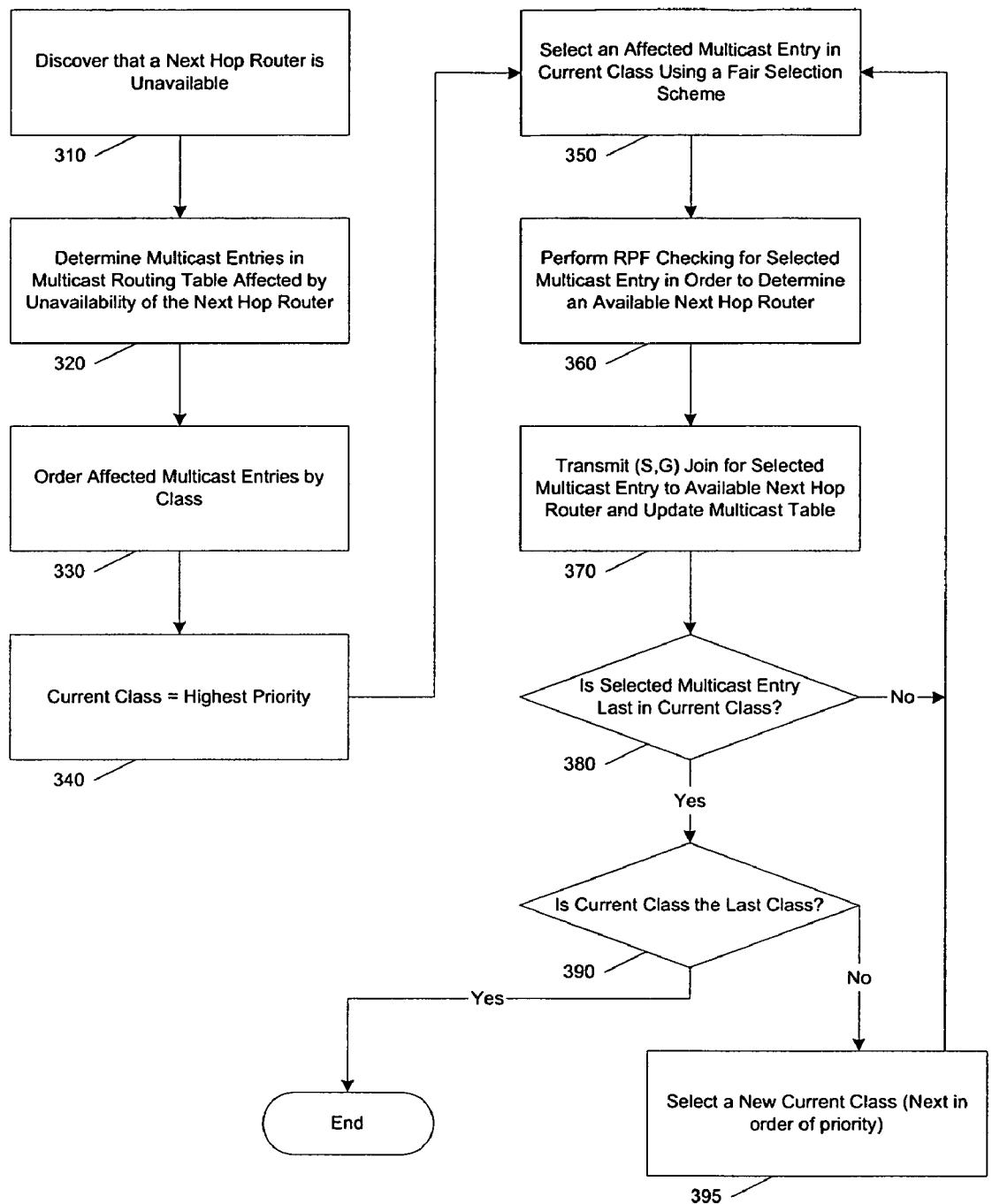
FIG. 3 is a simplified flow diagram illustrating multicast distribution tree convergence in accord with one embodiment of the present invention.

FIG. 3 is a simplified flow diagram illustrating multicast distribution tree convergence in a router in accord with one embodiment of the present invention. Initially, a network router can discover that a next-hop router has become unavailable (310). Unavailability of the next-hop router can be due to maintenance on the router, failure of the router, failure of a communication link between the next-hop router and the current router, and the like. Discovery of the unavailability of the next-hop router can occur, as stated above, through the use of internal gateway protocols that provide router availability information. A determination can then be made of those multicast entries that are affected by the unavailability of the next-hop router (320). Such a determination can be made through a review of a multicast routing table to determine those multicast entries that have the unavailable next-hop router as an associated next-hop router. The affected multicast entries can then be ordered by class (330). Class ordering can be set according to priority of the classes.

An initial current class can be selected that corresponds to the highest priority class or fastest response time class (340). Determination of which classes are high priority or fastest response can be made by a network administrator during configuration of the network router. A fair selection scheme, such as those discussed above, can be utilized to then select an affected multicast entry in the current class (350). RPF checking can be performed for the selected multicast entry in order to determine the identity of an available next-hop router (360). An (S,G) join for the selected multicast entry can then be transmitted to the new next-hop router (370). A determination can then be made as to whether the selected multicast entry is the last in the current class (380), and if not, then a next multicast entry in the current class can be selected and the process repeated (350-380). If the selected multicast entry is the last in the current class, then a determination can be made as to whether the current class is the last class that needs to be treated (390), and if not, then a new class can be selected as the current class (395) and the process repeated for that class. If the current class is the last class, then the process can end.

The use of a classification scheme as described can provide preferential treatment of multicast entries using a variety of criteria. Classification hierarchy can be based upon a priority scheme, a type of multicast traffic (e.g., premium video services or MVPNs), and per-customer or per-broadcast domain. In addition, a network administrator can determine how network processing should be expended. For example, a network router can remove itself from a multicast distribution tree using an (S,G) prune message. Since failure to process a prune promptly does not result in a disruption of service, prunes can be given a lower priority than convergence routines or (S,G) joins. Thus, a priority scheme can be configured in which convergence routines are performed in order of multicast state class, then (S,G) join procedures are performed in order of multicast entry class, and then prunes can be performed in order of multicast entry class.

Although examples have been given of a network environment in which a multicast distribution tree information is stored on a router-by-router basis using multicast routing tables in conjunction with unicast tables, such network environments are provided only as an example. Any network environment using protocols that permit reverse tree building can utilize the present invention. For example, an MPLS-type network using point-to-multipoint or multipoint-to-multipoint transport trees for multicast transmissions can also utilize the present invention.

An Example Router

Figure 4:
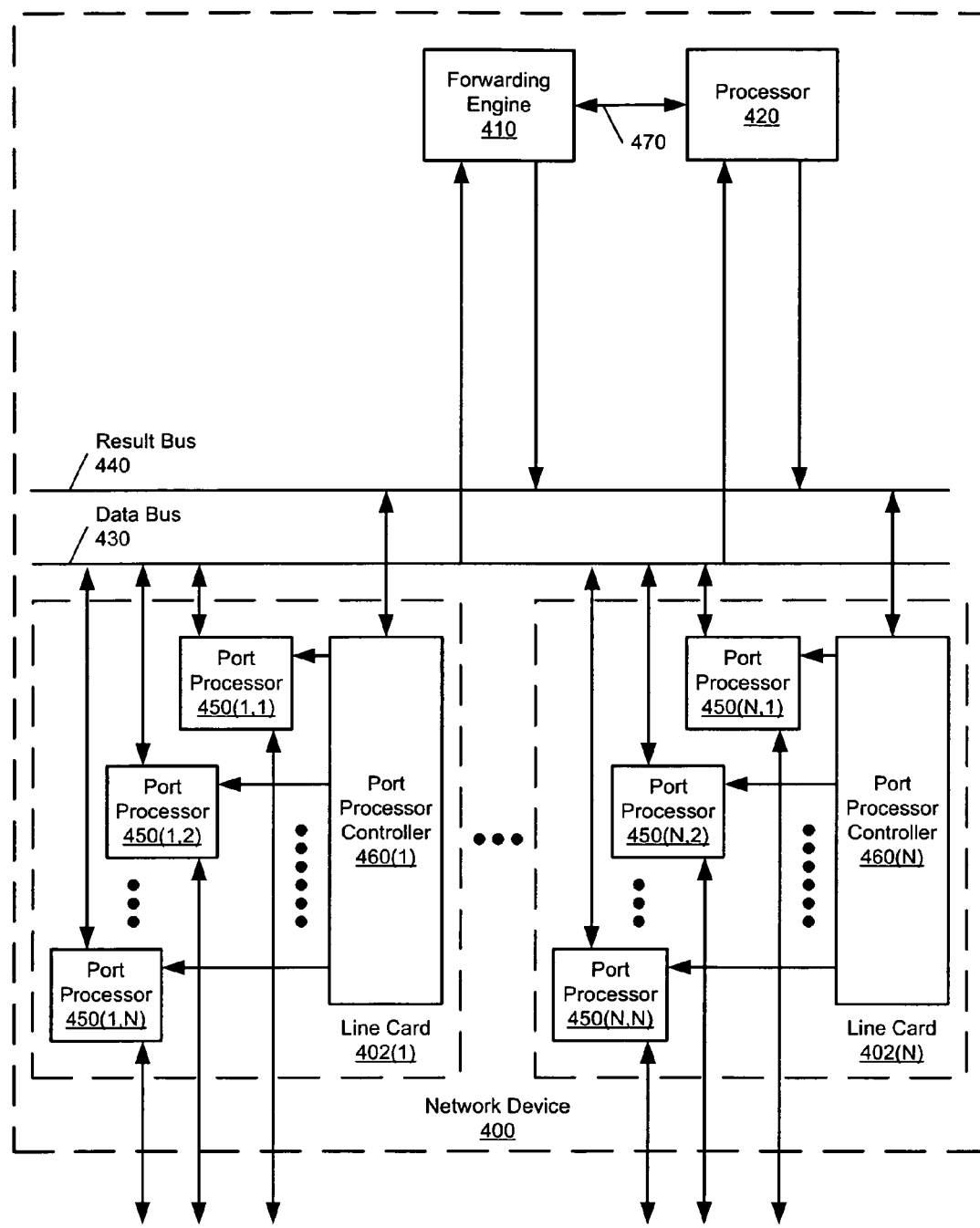
FIG. 4 is a simplified block diagram illustrating an example of a network routing device appropriate for implementing embodiments of the present invention.

FIG. 4 is a simplified block diagram illustrating an example of a network routing device appropriate for implementing embodiments of the present invention. In this depiction, network routing device 400 includes a number of line cards (line cards 402(1)-(N)) that are communicatively coupled to a forwarding engine 410 and a processor 420 via a data bus 430 and a result bus 440. Line cards 402(1)-(N) include a number of port processors 450(1,1)-(N,N) which are controlled by port processor controllers 460(1)-(N). It will also be noted that forwarding engine 410 and processor 420 are not only coupled to one another via data bus 430 and result bus 440, but are also communicatively coupled to one another by a communications link 470.

When a packet is received, the packet is identified and analyzed by a network routing device such as network routing device 400 in the following manner, according to embodiments of the present invention. Upon receipt, a packet (or some or all of its control information) is sent from the one of port processors 450(1,1)-(N,N) at which the packet was received to one or more of those devices coupled to data bus 430 (e.g., others of port processors 450(1,1)-(N,N), forwarding engine 410 and/or processor 420). Handling of the packet can be determined, for example, by forwarding engine 410. For example, forwarding engine 410 may determine that the packet should be forwarded to one or more of port processors 450(1,1)-(N,N). This can be accomplished by indicating to corresponding one(s) of port processor controllers 460(1)-(N) that the copy of the packet held in the given one(s) of port processors 450(1,1)-(N,N) should be forwarded to the appropriate one of port processors 450(1,1)-(N,N).

In the foregoing process, network security information can be included in a frame sourced by network routing device 400 in a number of ways. For example, forwarding engine 410 can be used to detect the need for the inclusion of network security information in the packet, and processor 420 can be called into service to provide the requisite network security information. This network security information can be included in the packet during the transfer of the packet's contents from one of port processors 450(1,1)-(N,N) to another of port processors 450(1,1)-(N,N), by processor 420 providing the requisite information directly, or via forwarding engine 410, for example. The assembled packet at the receiving one of port processors 450(1,1)-(N,N) can thus be made to contain the requisite network security information.

In addition, or alternatively, once a packet has been identified for processing according to the present invention, forwarding engine 410, processor 420 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of network router 100). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A network router implemented method comprising:
associating a first multicast state entry in a multicast routing table on the network router with a first class, wherein
the first multicast state entry identifies a first multicast state of a first multicast group, and
the first class identifies a first priority;
associating a second multicast state entry in the multicast routing table with a second class, wherein
the second multicast state entry identifies a second multicast state of a second multicast group, and
the second class identifies a second priority; and
selecting one of the first and second multicast state entries, wherein
said selecting is performed in response to a determination that an upstream router that is part of a first multicast distribution tree for the first multicast group and part of a second multicast distribution tree for the second multicast group is unavailable,
said selecting is determined according to highest priority provided by the first and second classes, and
said selecting is performed by a processor in the network router.

2. The method of claim 1 further comprising:
performing a multicast operation on the selected multicast state entry in the multicast routing table.

3. The method of claim 2 wherein the multicast operation comprises an RPF check, wherein the RPF (Reverse Path Forwarding) check is performed in support of building a multicast distribution tree for the selected multicast state entry.

4. The method of claim 1 further comprising:
transmitting a join message related to the selected multicast state entry in the multicast routing table.

5. The method of claim 4, wherein
the join message is in support of building a multicast tree for the selected multicast state entry.

6. The method of claim 5 wherein the join message comprises a PIM (Protocol Independent Multicast) join message.

7. The method of claim 1 further comprising:
including a first source identifier of the first multicast state entry in a forwarding information base, wherein the first source identifier is associated with a first index; and
including a second source identifier of the second multicast state entry in the forwarding information base, wherein the second source identifier is associated with a second index, and
the first priority is higher than the second priority if the first index is lower than the second index.

8. The method of claim 3 further comprising:
the RPF check is used to determine an available upstream router for the selected multicast state entry.

9. The method of claim 1, wherein
the first priority is higher than the second priority if the first class is associated with a higher quality of service than the second class.

10. The method of claim 1 further comprising:
associating a plurality of multicast state entries in the multicast routing table with the second class;
sequentially selecting, according to a first selection scheme, each of the plurality of multicast state entries on which to perform a first operation; and
sequentially selecting, according to a second selection scheme, each of the plurality of multicast state entries on which to perform a second operation, wherein
said first and second selection schemes provide a different ordering of the plurality of multicast state entries for the first and second operations, respectively.

11. The method of claim 10 wherein said first and second selection schemes use a round robin-type selection scheme.

12. A router element comprising:
a plurality of network line cards; and
a processor coupled to the network line cards wherein the processor is configured to
associate a first multicast state entry in a multicast routing table on the router element with a first class, wherein
the first multicast state entry identifies a first multicast state of a first multicast group, and
the first class identifies a first priority,
associate a second multicast state entry in the multicast routing table with a second class, wherein
the second multicast state entry identifies a second multicast state of a second multicast group, and
the second class identifies a second priority, and
select one of the first and second multicast state entries, wherein
said selection is determined according to highest priority provided by the first and second classes, and
said selection is performed in response to a determination that an upstream router that is part of a first multicast distribution tree for the first multicast group and part of a second multicast distribution tree for the second multicast group is unavailable.

13. The router element of claim 12 further comprising:
the processor further configured to
perform a multicast operation on the selected multicast state entry in the multicast routing table.

14. The router element of claim 12 further comprising:
a first network line card of the plurality of network line cards, wherein
the first network line card is configured to transmit a join message related to the selected multicast state entry.

15. The router element of claim 12 further comprising:
a memory coupled to the processor and configured to store a forwarding information base; and
the processor further configured to
include a first source identifier of the first multicast state entry in the forwarding information base, and
include a second source identifier of the second multicast state entry in the forwarding information base, wherein
the first priority is higher than the second priority if the first source identifier is associated with a lower index than the second source identifier.

16. The router element of claim 12, wherein
the first priority is higher than the second priority if a first response time for a first RPF check performed on the first multicast state entry is less than a second response time for a second RPF (Reverse Path Forwarding) check performed on the second multicast state entry.

17. The router element of claim 12 further comprising:
the processor further configured to
associate a plurality of multicast state entries in the multicast routing table with the second class,
sequentially select, according to a first selection scheme, each of the plurality of multicast state entries with the second class on which to perform a first operation, and
sequentially select, according to a second selection scheme, each of the plurality of multicast state entries with the second class on which to perform a second operation, wherein
said first and second selection schemes each provide a different ordering of the plurality of multicast state entries for the first and second operations, respectively.

18. An apparatus comprising:
a plurality of network line cards;
means for associating a first multicast state entry in a multicast routing table with a first class, wherein
the first multicast state entry identifies a first multicast state of a first multicast group, and
the first class identifies a first priority;
means for associating a second multicast state entry in the multicast routing table with a second class, wherein
the second multicast state entry identifies a second multicast state of a second multicast group, and
the second class identifies a second priority; and
means for selecting one of the first and second multicast state entries, wherein
said selecting is determined according to highest priority provided by the first and second classes, and
said selecting is performed in response to a determination that an upstream router that is part of a first multicast distribution tree for the first multicast group and part of a second multicast distribution tree for the second multicast group is unavailable.

* * * * *